United States Patent [19]
Locher et al.

[11] Patent Number: 5,202,628
[45] Date of Patent: Apr. 13, 1993

[54] EVALUATING CIRCUIT FOR LINEARIZING THE OUTPUT SIGNAL OF DIFFERENTIAL-CHOKE DISPLACEMENT TRANSMITTER

[75] Inventors: Johannes Locher, Stuttgart; Werner Fischer, Heimsheim; Joerg Barth, Muehlacker-Lienzingen, all of Fed. Rep. of Germany

[73] Assignee: Robert Bosch GmbH, Stuttgart, Fed. Rep. of Germany

[21] Appl. No.: 777,281
[22] PCT Filed: Feb. 28, 1991
[86] PCT No.: PCT/DE91/00177
  § 371 Date: Nov. 27, 1991
  § 102(e) Date: Nov. 27, 1991
[87] PCT Pub. No.: WO91/15735
  PCT Pub. Date: Oct. 17, 1991

[30] Foreign Application Priority Data
Apr. 4, 1990 [DE] Fed. Rep. of Germany ....... 4010772

[51] Int. Cl.$^5$ .................. G01B 7/14; G08C 19/06; G08C 19/12
[52] U.S. Cl. .................. 324/207.12; 324/207.16; 324/207.24; 340/870.31
[58] Field of Search .................. 324/207.11, 207.12, 324/207.16, 207.18, 207.19, 207.24, 225, 226; 336/45, 75, 79; 340/870.31, 870.35, 870.36

[56] References Cited
U.S. PATENT DOCUMENTS
3,721,821 3/1973 Blanyer .................. 324/207.19

Primary Examiner—Walter E. Snow
Attorney, Agent, or Firm—Michael J. Striker

[57] ABSTRACT

An evaluating circuit for linearizing the output signal of a differential-choke displacement transmitter has two inductive coils each supplied with an alternating voltage with constant frequency produced by an oscillator, wherein the amplitude is adjustable and the second alternating voltage is phase-displaced relative to the first alternating voltage by 180°. The signal which is picked up between the inductive coils at the input is compared, after a phase-controlled rectification, with a reference value and the deviation is integrated. With the aid of the integrated signal the regulation of the amplitude adjustment of the alternating voltages is performed. As a result a measuring signal without residual ripple is obtained, which changes proportionally to an adjustment path for example of an adjustment rod.

6 Claims, 2 Drawing Sheets

EVALUATING CIRCUIT FOR LINEARIZING THE OUTPUT SIGNAL OF DIFFERENTIAL-CHOKE DISPLACEMENT TRANSMITTER

BACKGROUND OF THE INVENTION

The present invention relates to a measuring circuit for a differential-choke transmitter, i.e. to a measuring circuit which generates a measurement voltage for measurement of the displacement of an adjusting rod of a displacement transmitter. The invention also relates to a method of using the measuring circuit.

An evaluating circuit which can be used in combination with various conventional displacement transmitters is described in an article entitled "Using the NE 5521 Signal Conditioner in Multi-faceted Applications", by Z. Rahim in Valvo-Datenbuch 1988, Professional Integrated Analog and Special Circuits [Professionelle integrierte Analog- und Spezialschaltungen], Dr. Alfred Hüttig Verlag, Heidelberg, pages 818 and 819. This is a circuit with a measuring principle such as has been used many times. Namely, a sinusoidal voltage is applied to a transmitter, e.g. a differential-choke displacement transmitter, and the induction voltage is evaluated, which is effected by phase-coupled rectification and smoothing of the rectified induced sine signal. A problem in circuits with this known principle consists in that considerable expenditure must be made on circuits which smoothing the measurement signal so that the latter changes in proportion to the adjustment path of the adjusting rod of the transmitter without excessive residual ripple.

An evaluating circuit which works according to another principle for application with a semi-differential short-circuit ring displacement transmitter is described in EP 88 903 834. This is a circuit in which an alternating voltage of constant amplitude and fixed frequency is applied to a first output terminal and an alternating voltage of identical frequency, but variable amplitude, is applied to the other output terminal. The adjustable amplitude is varied until the voltage tapped at the center tap of the transmitter is zero. The value of the variable amplitude as presented in this balancing condition is a direct measurement for the path adjusted at the transmitter. The value of the amplitude is in turn directly proportional to the value of a control voltage by which the amplitude is adjusted. This means that the control voltage is also directly proportional to the adjustment path. Since the control voltage is a d.c. voltage, the measurement voltage has no ripple, specifically without the use of expensive smoothing measures.

As is the case with a semi-differential short-circuit ring displacement transmitter, a differential-choke displacement transmitter likewise has two end terminals and a middle terminal. However, if a differential-choke displacement transmitter were connected to the evaluating circuit known from the aforementioned European publication in the same way as the semi-differential short-circuit ring displacement transmitter, the measurement voltage would change in a sharply nonlinear manner with the adjustment path of the adjusting rod of the transmitter. If a measurement signal which changes in a linear manner with the adjustment path is also to be obtained when a differential-choke displacement transmitter is connected, the connection must be effected via a resistance network with the aid of a d.c. voltage source. The German Patent Application DE 39 27 833, which does not have a prior publication date, describes how such a connection can be effected. A disadvantage in connecting the differential-choke displacement transmitter with the aid of a d.c. voltage source consists in that a d.c. voltage is necessary at the input terminal, which causes parasitic capacitances with ground can to generate erroneous characteristic lines. The relationship between the adjustment path and measured signal is accordingly somewhat nonlinear, although precisely a linear relationship should be caused with the connection via the network with the aid of the d.c. voltage. The parasitic capacitances to ground would not have any effect on the characteristic line configuration if there were no d.c. voltage at the input terminal in the case of balancing.

With respect to the problems described here there has always been a desire to have available an evaluating circuit for a differential-choke displacement transmitter providing a measurement signal without residual ripple, which changes in proportion to the adjustment path of the adjusting rod of such a transmitter without producing erroneous characteristic lines. Moreover, how such a differential-choke displacement transmitter can be used in combination with such a circuit has been problematic.

SUMMARY OF THE INVENTION

It is an object of the present invention to provide a measuring or evaluating circuit for a differential-choke displacement transmitter which can be combined with the differential-choke displacement transmitter without problems, but which also provides a measurement signal without residual ripple which changes in direct proportion to the displacement of the adjusting rod.

The evaluating circuit, according to the invention, for a differential-choke displacement transmitter has the following features:

a first output terminal, a first oscillator means which supplies a first alternating voltage to the first output which first alternating voltage has a constant frequency and whose amplitude is adjustable by a first amplitude adjusting means, a second output terminal, a second oscillator means which supplies a second alternating voltage to the second output terminal, on which second alternating voltage has the same frequency as the first alternating voltage, is out of phase by 180° relative to it, and whose amplitude is adjustable by a second amplitude adjusting means, an input terminal for supplying an input signal, a phase-controlled rectifier which is connected with the input terminal for rectifying the alternating voltage component in the input signal, a comparison device which is connected with the rectifier and obtains its output signal as an actual, value signal and compares the latter with a required value signal to form an actuating signal or regulating deviation signal, and an integrator which is connected with the comparison device for integrating the regulating deviation signal and which sends the integrated signal, as amplitude adjusting signal, to the amplitude adjusting means of the two oscillator means in such a way that the amplitude of the voltage at an output terminal is increased by exactly the value by which the amplitude of the voltage at the other output terminal is lowered, so that the sum of the amplitudes remains constant.

This evaluating circuit differs from those described in EP 88 903 834 in that the first oscillator means does not supply an alternating voltage of constant amplitude, but rather amplitude such that the sums of the amplitudes of the alternating voltages at the two output terminals remains constant.

The change just mentioned makes it possible to connect a differential-choke displacement transmitter directly to the evaluating circuit without a resistance network or d.c. voltage supply, specifically so that the middle terminal between the two coils of the transmitter is connected with the input terminal,
and one of the two end terminals of the transmitter is connected with an output terminal,
so that the amplitude of either of the two output voltages is a proportional measurement for the adjustment path.

An advantage in the application just mentioned consists in the amplitude of the two output voltages which increases as the adjustment path increases is used as measurement for the adjustment path. In this case a directly proportional relationship is obtained, while an inversely proportional relationship is obtained when using the amplitude of the other output voltage, which is generally less favorable for further evaluation than the directly proportional relationship.

The circuit supplies a d.c. voltage without any ripple as a measurement for the adjustment path in that the amplitude of the alternating voltages depends directly on the d.c. voltage control value of the integrator. In the steady state, the voltage at the input terminal has the value of zero, which is why parasitic capacitances to ground do not affect the characteristic line configuration.

The evaluating circuit, according to the invention, thus enables a simple connection of a differential-choke displacement transmitter and supplies a d.c. voltage signal without ripple, whose voltage value changes in proportion to the adjustment path of the adjusting rod of the transmitter without producing erroneous the characteristic lines.

To prevent regulating oscillations in the evaluating circuit as much as possible, it is advantageous to use a regulating circuit in the first oscillator means, which regulating circuit regulates the amplitude of the alternating voltage supplied by this oscillator means to the value predetermined by the required delivered by the integrator subsequent to the input connection.

BRIEF DESCRIPTION OF THE DRAWING

The objects, features and advantages of the present invention will now be illustrated in more detail by the following detailed description, reference being made to the accompanying drawing in which.

DESCRIPTION OF THE EMBODIMENT EXAMPLES

Figure 1:
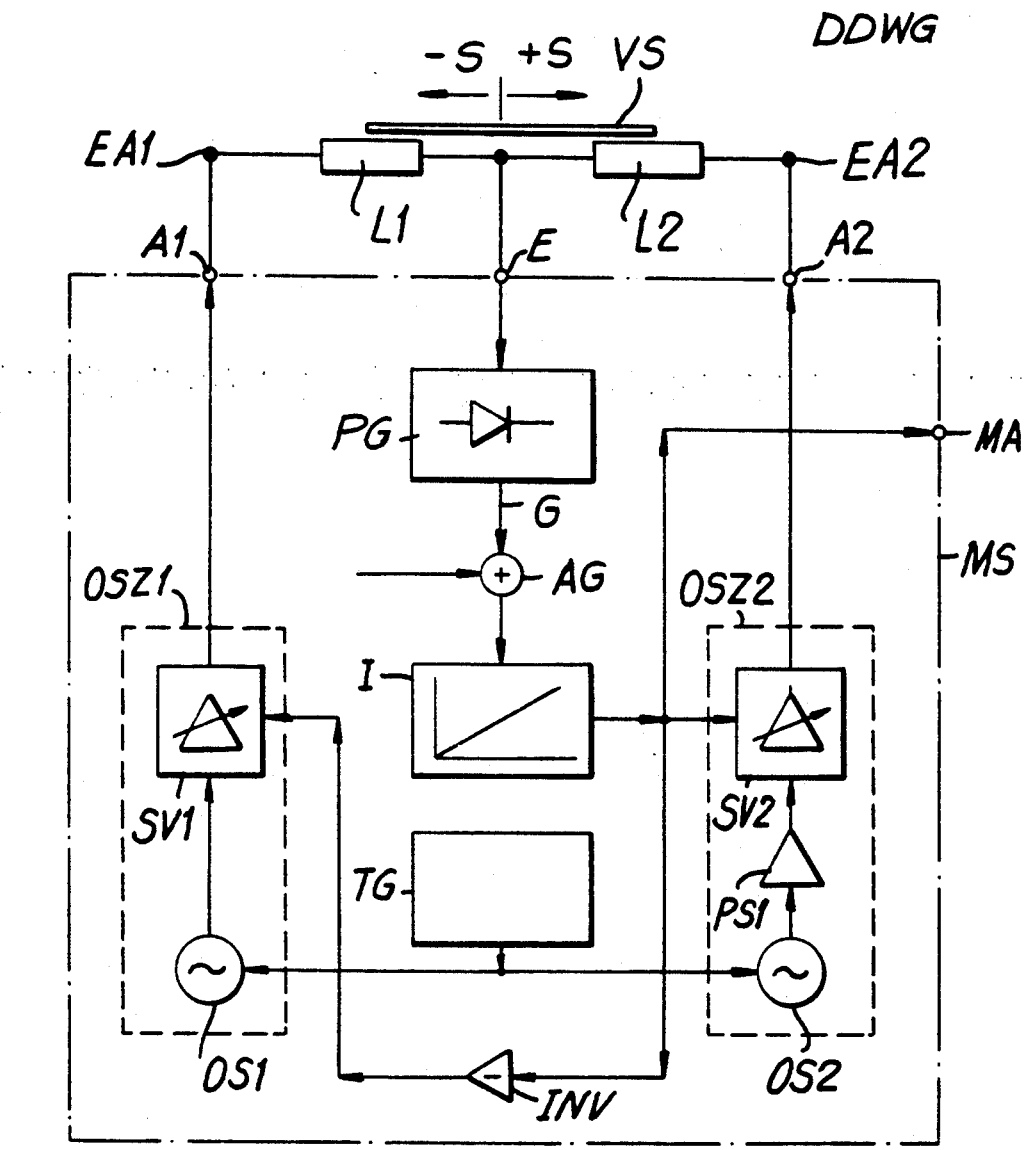
FIG. 1 is a block wiring diagram of an evaluating circuit for a differential-choke displacement transmitter with connected transmitter.

The evaluating circuit MS shown in FIG. 1 and enclosed by a dash-dot line has a first output terminal A1, a second output terminal A2, a measuring terminal MA and an input terminal E. The first output connection A1 receives a sinusoidal alternating voltage of constant frequency, but variable amplitude, from a first oscillator means OSZ1. In the embodiment examples the frequency is 10 kHZ the maximum of and the point-to-point amplitude is 4 V. This frequency is predetermined by a clock generator TG which also drives a second oscillator means OSZ2 which supplies a sinusoidal alternating voltage, likewise with variable amplitude, to the second output terminal A2. The frequency of this oscillation matches that at the first output terminal A1, but is out of phase by 180° relative to it.

The oscillations in the two oscillator means OSZ1 and OSZ2 are generated by oscillators OS1 and OS2, respectively, based on the signal from the clock generator TG. A phase shifting invertor PS1 with connected controllable amplifier SV2 follows the oscillator OS2 in the second oscillator means OSZ2. A controllable amplifier SV1 is directly connected to the oscillator OS1 in the first oscillator means OSZ1.

Instead of the construction of the oscillator means just described, oscillator means using only one oscillator could also be used. The phase shifting invertor PS1 could also be omitted if the two oscillators OS1 and OS2 were excited by the signal from the clock generator RG in such a way that they oscillate in antiphase. However, it is advantageous to use the phase shifting invertor PS1, since possible small phase errors requiring a deviation from the accurate phase inversion can be corrected.

The controllable amplifiers SV1 and SV2 are controlled by a signal which is derived from the input signal as tapped at the input connection E. In the practical application of the circuit, this is an alternating voltage signal with the same signal shape and the same frequency as the output signals. The input signal is rectified in a phase-controlled rectifier PG while taking into account the phase relation relative to the first output signal. The rectified signal G is fed to an adder AG as actual value for the aforementioned amplitude regulation. A predetermined required value is subtracted from the actual value to obtain a regulating deviation signal. This is integrated in an integrator I whose output signal is the control signal for the second controlled amplifier SV2. This control signal is simultaneously sent to the measuring terminal MA. Moreover, it is inverted by an invertor INV. The inverted signal controls the first controllable amplifier SV1.

As already mentioned above, the maximum point-to-point amplitude of the alternating voltage signals in the embodiment example is 4 V. This value is supplied at an integration voltage of 5 V. At 0 V integration voltage the point-to-point amplitude has the value of zero. At 2.5 V integration voltage the point-to-point amplitude is 2 V. This relationship makes it possible to make do with control voltages of the logical components of 0 V and +5 V. In this case, the invertor INV inverts at the mean voltage, i.e. the reference voltage of 2.5 V. If the integration voltage is accordingly 3 V (2.5 V+0.5 V), the second controllable amplifier SV2 is driven by this voltage, while the first controllable amplifier SV1 is driven with 2 V (2.5 V−0.5 V).

A differential-choke displacement transmitter DDWG is connected to the evaluating circuit MS according to FIG. 1. Its end terminals EA1 and EA2 are connected with the output terminals A1 and A2, respectively. Its middle terminal M is connected to the input terminal E. The differential-choke displacement transmitter DDWG has two windings with inductance values L1 and L2. If an adjusting rod VS is symmetrical to the two windings, the inductance values are equal. If the adjusting rod VS is displaced from the symmetrical position a distance s in the direction of the first winding, its inductance value L1 increases. In this case, the following applies:

$$L2 \sim s \tag{1}$$

$$L1+L2=k2 \tag{2}$$

with k1 and k2 being constants.

The function of the evaluating circuit MS according to FIG. 1 with the differential-choke displacement transmitter DDWG connected in the described manner is explained in more detail in the following with reference to FIG. 2.

Different input signals may be applied to the input terminal E corresponding to FIGS. 2a-2c at different times, namely, according to FIG. 2a, an input signal which is antiphase to the first output signal, followed by one with a constant zero level (FIG. 2b) and finally one which oscillates in phase with the first output signal. The second output signal is measured at the second output terminal A2. This is always antiphase to the first output signal. In the case of the antiphase input signal with reference to the first output signal, the amplitude of the second output signal is always smaller as a result of the action of the integrator I, while the amplitude of the first output signal is always larger, which is indicated in FIG. 2a by corresponding arrows. In the case of the constant input signal, the amplitudes of the two output signals remain unchanged (FIG. 2b), since the integration value then remains at a fixed value. In the case of the in-phase input signal, the amplitude of the second output signal increases due to the action of the integrator I, while the amplitude of the first output signal decreases, which is shown in FIG. 2c by corresponding arrows.

The amplitudes of the two output signals are thus adjusted until the voltage at the input terminal is permanently zero. As a result of the described construction of the circuit, the following equation is given for the amplitude values:

$$V1+V2=k3 \tag{3}$$

Due to the conditions of equations (2) and (3), the following applies in the case of balancing:

$$V1: L1 = V2: L2 = k4 \tag{4}$$

It follows from equations (1) and (4) that $$V2/k4 \sim s \tag{5}$$

The amplitude V2 of the second output signal depends on the measurement voltage V_MA which can be tapped at the measurement terminal MA as supplied by the integrator I as follows:

$$V2 = k5 \times V\_MA \tag{6}$$

It follows from equations (5) and (6) that:

$$V\_MA \sim s \tag{7}$$

As can be seen, the voltage V_MA sent at the measurement terminal MA under the conditions realized by the circuit changes in proportion to the adjustment path s of the adjusting rod VS.

Figure 2:
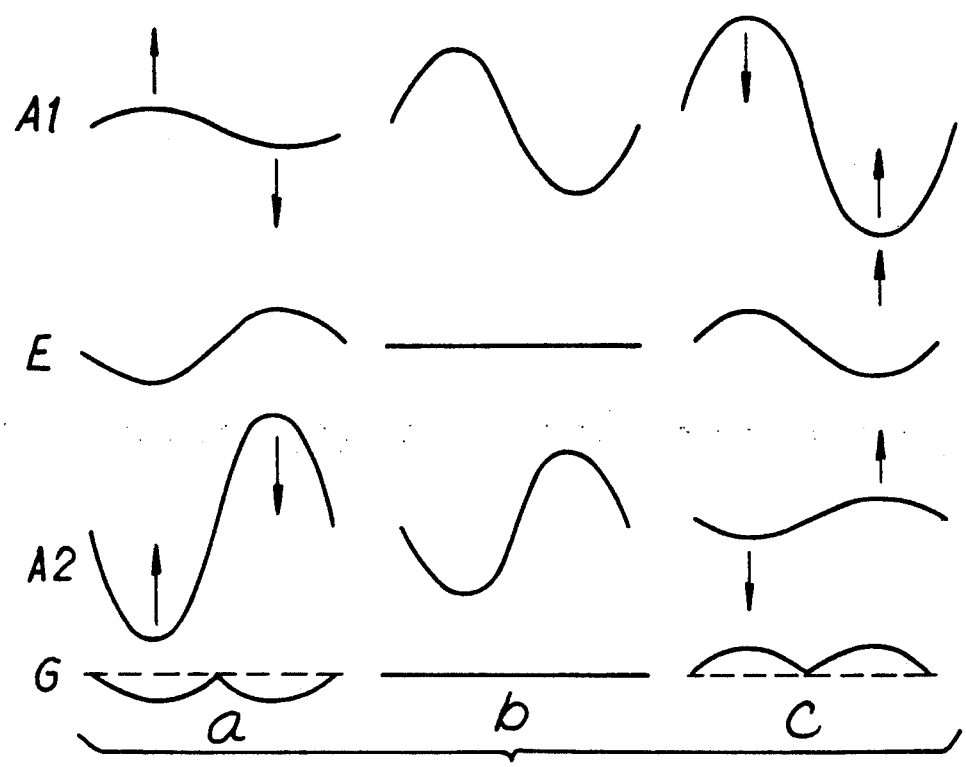
FIGS. 2a-c are graphical illustrations of three series of four time-correlated signals as they occur in the circuit according to FIG. 1 as a function of amplitude and phase of an input signal.
Figure 3:
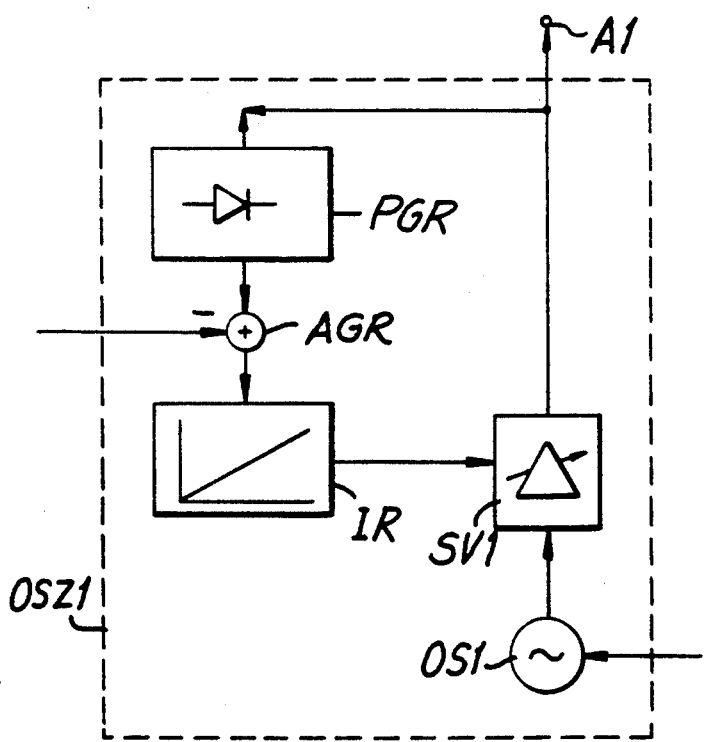
FIG. 3 is a block wiring diagram for a first oscillator means as used in the circuit according to FIG. 1, supplemented by an amplitude regulating circuit.

As concerns details of the circuit according to FIG. 1, reference is made to the circuit according to FIG. 2 of the published European Application 88 903 834. It is also indicated in the latter that the value formed by the integrator I is preferably supplied via a sample/hold circuit so as to counteract regulating oscillations. Additional measures can be taken to counter regulating oscillations in the circuit according to FIG. 1. Namely, the amplitude of the signal supplied by the first oscillator means OSZ1 can be controlled in an advantageous manner, as is illustrated in FIG. 1. In this case, the first controllable amplifier SV1 is not directly driven by the signal supplied by the invertor INV, rather this signal serves as a reference value which is subtracted in an adder AGR from an actual value signal formed from the output signal of the first controllable amplifier SV1 with the aid of a phase-coupled rectifier PGR. The regulating deviation signal formed by the adder AGR is integrated by an integrator IR. The first controllable amplifier SV1 is first controlled with the integrated signal.

It will be understood that each of the elements described above, or two or more together, may also find a useful application in other types of constructions differing from the types described above.

While the invention has been illustrated and described as embodied in a measuring circuit for inductive displacement transmitters, especially differential-choke displacement transmitters, and method of using same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Evaluating circuit for a differential-choke displacement transmitter having two inductance coils (C1, C2) connected with one another in a connecting point and an adjusting rod (VS) mounted movably in the vicinity of the two inductance coils, the evaluating circuit comprising:
a first output terminal (A1);
a first oscillator means (OSZ1) including a first amplitude adjusting means (SV1), said first oscillator means (OSZ1) being connected to the first output terminal (A1) to provide a first alternating voltage at the first output terminal (A1), said first alternating voltage having a constant frequency and an amplitude adjustable by the first amplitude adjusting means;
a second output terminal (A2);

a second oscillator means (OSZ2) including a second amplitude adjusting means (SV2), said second oscillator means (OSZ2) being connected to the second output terminal (A2) to provide a second alternating voltage at the second output terminal (A2), said second alternating voltage having a constant frequency and an amplitude adjustable by the second amplitude adjusting means (SV2);

an input terminal (E) for receiving an input signal from the connecting point of the two inductance coils (L1, L3) and depending on a position of the adjusting rod (VS) of the differential-choke displacement transmitter, a phase-controlled rectifier (PG) connected with the input terminal (E) for rectifying an alternating voltage component of the input signal to produce a rectifier output signal, a comparison device (AG) connected with the phase-controlled rectifier (PG) to receive the rectifier output signal as an actual value signal and to compare the rectifier output signal with a predetermined reference value to form a regulating deviation signal, and an integrator (I) connected with the comparison device (AG) to receive and integrate the regulating deviation signal to produce an integrated signal as an amplitude adjusting signal, said integrator also being connected to said first and second amplitude adjusting means so that said amplitude adjusting means are acted on by said integrated signal and are controlled by said integrated signal so that the sum of the amplitudes of the first and second alternating voltages at said output terminals is constant.

2. Evaluating circuit as defined in claim 1, further comprising a measurement output terminal (MA) connected to the integrator (I) so as to receive said integrated signal and to produce a measuring signal proportional to an adjusting path (s) of the adjusting rod (VS).

3. Evaluating circuit as defined in claim 1, further comprising a regulating circuit (PGR, AGR, IR) for regulating the amplitude of the first alternating voltage of the first oscillator means (OSZ1).

4. Evaluating circuit as defined in claim 3, wherein said regulating circuit includes another phase-controlled rectifier connected to said first amplitude adjusting means to receive said first alternating voltage, another comparison means connected to said other phase-controlled rectifier, and another integrator connected to said other comparison means to produce another integrated signal, said other integrated signal being received by said first amplitude adjusting means to control said first amplitude adjusting means.

5. Evaluating circuit and inductive displacement transmitter apparatus comprising the evaluating circuit as defined in claim 1 and a differential-choke displacement transmitter connected to said evaluating circuit, said differential-choke displacement transmitter (DDWG) having two end terminals (EA1,EA2), a middle terminal (M), two inductance coils (L1,L2), each of said inductance coils being connected electrically between one of the end terminals and the middle terminal, and an adjusting rod (VS) mounted movably in the vicinity of the two inductance coils (L1,L2), wherein one (EA1) of said two end terminals is connected to said first output terminal (A1) of said evaluating circuit, the other (EA2) of said two end terminals is connected to said second output terminal (A2) of said evaluating circuit and the middle terminal (M) is connected to said input terminal (E) of said evaluating circuit.

6. Method of measuring an adjustment path (s) of an adjusting rod (VS) of a differential-choke displacement transmitter (DDWG) having two end terminals (EA1, EA2) and a middle terminal (M) and two inductance coils (L1, L2), each of said inductance coils being connected electrically between one of said end terminals and said middle terminal, using the evaluating circuit defined in claim 1, comprising the steps of:

a) connecting the middle terminal (M) to the input connection (E) of the evaluating circuit;

b) connecting one end terminal (EA1) with the first output terminal (A1) of the evaluating circuit;

c) connecting another end terminal (EA2) with the second output terminal (A2) of the evaluating circuit; and d) connecting a measurement output terminal (MA) with the integrator (I) to receive an integrated signal and to produce a measuring signal proportional to an adjusting path (s) of the adjusting rod (VS).

* * * * *